United States Patent [19]

De La Paz Rios

[11] Patent Number: 4,583,952
[45] Date of Patent: Apr. 22, 1986

[54] METHOD FOR TEACHING MULTIPLICATION AND DIVISION WITH NUMBERS 6 THROUGH 9

[76] Inventor: Evelyn De La Paz Rios, P.O. Box 2512, Globe, Ariz. 85502

[21] Appl. No.: 703,713

[22] Filed: Feb. 21, 1985

[51] Int. Cl.⁴ .................................... G09B 19/02
[52] U.S. Cl. ............................. 434/191; 435/205
[58] Field of Search ......................... 434/191, 205

[56] References Cited
FOREIGN PATENT DOCUMENTS
295723 5/1929 United Kingdom ............... 434/205

OTHER PUBLICATIONS
Edwin M. Lieberthal, "The Complete Book of Fingermath", ©1979, QA 115 L53, CL 434 Library.

Primary Examiner—Harland S. Skogquist
Attorney, Agent, or Firm—James F. Duffy; Robert A. Hirschfeld

[57] ABSTRACT

A teaching methodology provides the student with hand conformed symbols representative of the numbers 6 through 9. Observation of these symbols permits the students to use their mastery of multiplication of the numbers 1 through 5 and 10 to solve problems in multiplication and division involving the numbers 6 through 9.

3 Claims, 1 Drawing Figure

| THIS... | OR | THIS... | SYMBOLIZES | NUMBER |
|---|---|---|---|---|
|  | |  | | 6 |
|  | |  | | 7 |
|  | |  | | 8 |
|  | |  | | 9 |

*Table 1*

10     10     10 = 30

6     7

4 x 3 = 12
(6) x (7) = 42

METHOD FOR TEACHING MULTIPLICATION AND DIVISION WITH NUMBERS 6 THROUGH 9

PRIOR ART STATEMENT

In the interest of full disclosure, the Applicant notes the following prior art uncovered in the course of researching the background art in the field of teaching methodology and devices:

| INVENTOR | PATENT NUMBER | ISSUE DATE |
| --- | --- | --- |
| Huston, D. D. | 1,269.713 | 6/18/18 |
| Dodd, S. C. | 1,527,126 | 2/17/25 |
| Needham, I. B. | 2,562,633 | 7/31/51 |
| Louis, F. C. | 173,363 | 11/02/53 |
| Cormack, C. H. | 2,748,500 | 6/05/56 |
| Huff, D. E. | 2,901,839 | 9/01/59 |
| Rice, M. R. | 3,280,480 | 10/25/66 |
| Harris, T. W. | 3,345,759 | 10/10/67 |
| Smith, L. J., Jr. | 3,374,559 | 3/26/68 |
| Milligan, et al. | 3,777,416 | 12/11/73 |
| Romstad | 3,874,096 | 4/01/75 |
| Seiden | 4,281,835 | 8/04/81 |
| Wentworth | 4,372,742 | 2/08/83 |
| Steinmann | 4,419,081 | 12/06/83 |

BACKGROUND

1. Field of The Invention

The invention relates to the field of education.

Particularly, the invention provides the methodology for teaching students to mathematically manipulate the numbers 6 through 9, inclusive.

More particularly, the methodology of the invention lends itself to teaching multiplication and division when the multipliers, divisors and quotients lie in the range of number values 6 through 9 inclusive.

2. Prior Art

The prior art is replete with devices for teaching the times-table, division and like mathmatical operations. No prior art in the methodology of teaching is known which invovles conforming the hands into SYMBOLS representative of number values. For purposes of this disclosure, the mere extension of fingers equal in number to the numerical value to be represented is not deemed to be equivalent to conforming the hands into SYMBOLS representative of number values.

It is well known that devices which perform functions which can readily be performed by hand are, in general, not patentable. A review of the literature relating to attempts to patent such devices indicates the "performance by hand" referred to in denying patentability involved the hands in manipulating a device such as a pencil, or a hand tool.

The methodology of the present invention does not involve the use of the hands in a manipulative sense. Rather, the hands are conformed so as to form SYMBOLS representative of numerical values. These symbols provide an educational aid, always readily available to the student, to be utilized by the student in the cognitive process of number multiplication and division.

Methods are known which manipulate the fingers of the hands, much as one manipulates the beads of an abacus, in order to derive arithmetical results. These are basically counting methods involving no hand conforming symbology representative of specific numbers.

In learning the multiplication or times-tables, students seldom experience difficulty in learning to multiply by the numbers 1 through 5.

The ability to multiply by 10 is readily achieved. However, multiplication by the numbers in the range 6 through 9 inclusive often proves a stumbling block for students, especially those with learning disabilities.

The methodology taught herein provides the student with hand conformed symbols representative of the numbers 6 through 9. Observation of these symbols permits the students to use their mastery of multiplication of the numbers 1 through 5 and 10 to solve problems in multiplication and division involving the numbers 6 through 9.

It is an object of the present invention to provide students, as a teaching aid, hand conformed symbols which represent the numbers 6 through 9.

It is a further object of the present invention to teach students to observe such hand conformed symbols and derive the product of two numbers so symbolized.

It is a still further object of the present invention to teach students to solve problems in division when the divisor is in the range of numbers 6 through 9 and the dividend is a number of value greater than the divisor.

SUMMARY OF THE INVENTION

The invention presents a visual, kinesthetic, tactile and sometimes audible method for teaching students to mathematically manipulate the numbers 6 through 9. The students are taught to conform the fingers of a first one of either of their hands to form a symbol representative of one of a selected number in the range 6 through 9 inclusive. These symbols are constructed by beginning with all of the fingers of either hand folded to form a fist. The symbol for the number 6 is constructed by raising one finger; the symbol for the number 7 is made by raising two fingers. Similarly, the symbols for the numbers 8 and 9 are constructed by conforming the hand with three and four fingers raised respectively. Having conformed the fingers of one hand so as to represent the symbol for a first select number, the fingers of the second hand are similarly conformed to form a selected second number.

The student then assigns a value of TEN to each of the upraised fingers in each of the hands forming the symbols. Each of the fingers which remain folded in each hand are assigned a value of ONE.

The product of the two selected numbers now represented by the hand conforming signals is determined by counting by TENS on each of the upraised fingers of both hands. The accumulated tens value is noted. The number of folded fingers, each having a value of ONE on the first hand is multiplied by the number of folded fingers, again each having a value of ONE, on the second hand.

The product produced by multiplying the ONES value fingers on one hand by the ONES value fingers on the second hand is added to the accumulated TENS value of the upraised fingers on both hands. This sum represents the product of the numbers represented by the hand conformed symbols.

To reinforce the teaching, the counting and multiplication may be performed audibly.

The method may be utilized in teaching division when the divisor is in the range of 6 through 9 and the dividend is a number greater than the divisor. Since the dividend of a division problem is merely the product of the divisor and the quotient, one of the student's hands may be conformed into a symbol representative of the divisor. The student's second hand is conformed into a symbol representative of a selected quotient. If the product derived based on multiplication of the divisor and the quotient, as represented by the symbols formed by the conformation of the hands, is greater than the dividend, the student will select a second trial quotient of a lower order of magnitude. If the product is lesser than the dividend, the student will select a trial quotient of a greater order of magnitude. The process continues until the product produced is equivalent to the dividend or is less than the dividend by a value lesser in magnitude than that of the divisor.

DESCRIPTION OF THE DRAWINGS

The single sheet of drawings provided present a single FIGURE showing a pair of hands conformed to symbols representative of the numbers 6 and 7 and includes the numerical process by which the product of 6 and 7 is obtained. The manner in which the hands are conformed to produce symbols representative of numbers in the range 6 through 9 inclusive is presented in Table 1 on the drawing sheet.

DETAILS OF THE INVENTION

Figure 1:
Figure 1:
Figure 1:
Figure 1:
Figure 1:
Figure 1:
Figure 1:
Figure 1:
Figure 1:
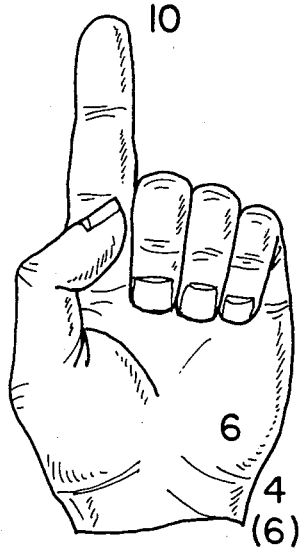
Figure 1:
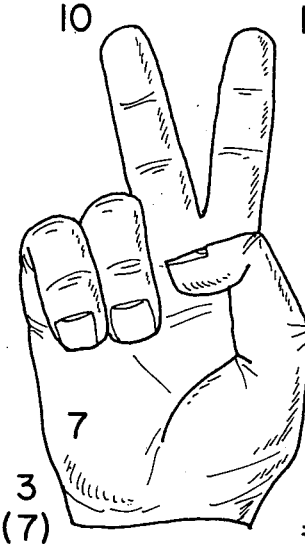

For the purposes of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications in the illustrated device; and such further applications of the principles of the invention as illustrated herein being contemplated as would normally occur to one skilled in the art to which the invention relates.

In practicing the methodology disclosed herein, a student is taught to conform his hands into symbols representative of numbers 6 through 9. If one finger of either hand is extended, the symbol for the number 6 is formed. If two fingers of either hand are extended, the symbol for the numeral 7 is formed. Extending three fingers provides the symbol representative of the numeral 8; four fingers extended is the symbol representative of the number 9. In keeping with the foregoing, extending all five fingers will produce a symbol representative of the numeral 10. This last symbol is usually not required since the student readily achieves a capability of multiplying by TEN.

For each finger that is extended in conforming the hand to any given symbol, the value of TEN is assigned.

Table 1 illustrates the manner in which the fingers of either hand may be conformed to produce a symbol representative of numbers in the range 6 through 9. To illustrate the manner in which these hand conformed symbols are utilized to teach students multiplication, reference is made to FIG. 1 illustrating a first hand conformed to a symbol representative of the number 6 and a second hand conformed to a symbol representative of the number 7.

In deriving the product of the numbers 6 and 7, the student will conform his hands in the manner illustrated in FIG. 1. Each of the extended fingers is assigned a value of TEN. As may be seen, three fingers are extended to produce an intermediate value of 30, which value is noted. In the hand conformed to the symbol for the number 6, four fingers remain folded while in the hand conformed to the symbol representative of the number 7, three fingers remain folded. Assigning a value of ONE to each of these folded fingers, the student computes the product, 4 times 3, and notes that value which is added to the intermediate value 30 earlier obtained. This results in the sum 42, which is the product of the numbers 6 times 7.

As the student's memory improves and as experience with multiplication is gained, the student will remember that the product of 6 and 7 is 42, however, should memory fail, the student merely has to form the symbols representative of these numbers by so conforming his hands as indicated in FIG. 1 to produce the desired product.

The teaching method may be utilized in instructing students to perform division. Let it be assumed that the student is asked to divide 42 by 6. Forty-two is the dividend and 6 is the divisor. The student conforms one hand into the symbol representative of the divisor 6. The student then conforms his other hand into a symbol representative of a trial quotient. Reference should be made to Table 1 to facilitate an understanding of the following discussion.

With the fingers of one hand conformed to the symbol representative of the number 6, the student has one finger extended. Suppose the student selects 6 as the quotient. He conforms his other hand to the symbol representative of 6 and now has two fingers in total extended. This yields an intermediate value of 20 upon application of the rules set forth earlier. This value is much lower than the dividend 42. The student will then select another trial quotient. Let it be assumed that the student selects 8 as the trial quotient. He conforms his hand into the symbol representative of the number 8. He now sees that one hand has one finger extended representative of the divisor 6 and the second hand with three fingers extended representative of the number 8. He is thus represented with four extended fingers for an intermediate value of 40. This is close to the value of the dividend 42 so the student proceeds with the multiplication, four fingers are down in the hand conformed to the symbol for the numeral 6 and two are down in the hand conformed to the symbol for the numeral 8. Four times 2 is 8, plus the intermediate value of 40 produces a product 48. This is larger than the dividend in the problem and thus, the selected trial quotient of 8 is too large.

In his two trials, the student has determined that a quotient equivalent to 6 is too small while a quotient equivalent to 8 is too large. The student thus conforms his hand to a trial quotient between these two numbers, that is a trial quotient of 7. Conforming his hands to the symbols representative of the divisor 6 and the new trial quotient 7, the student sees the symbols as represented in FIG. 1. Applying the rules here presented the student derives the product of the divisor 6 and the quotient 7 and determines that the resulting product is equal to the dividend in the problem represented to him. Thus, the student determines that 42 divided by 6 is equal to 7.

The examples just given are illustrative of the methodology of the invention and may be readily extended to providing students with hand conforming symbolic representations of numerals 6 through 9, which symbols act as a teaching aid enabling the student to perform the cognitive processes necessary for multiplication and division involving numbers within this range.

What has been disclosed is a methodolgy for teaching a student to conform his hands into symbols representative of numbers in the range 6 through 9. With such symbols presented to him, the student is taught to derive the product of the numbers represented by the hand conformed symbols of each hand. Those skilled in the art may conceive of other educational uses of the methodology disclosed herein. To the extent that such other uses are drawn from the teachings here, it is intended that such alternate uses will fall within the ambit of protection of the claims appended hereto.

Having described my invention in the foregoing specification and the accompanying drawing in such clear and concise manner that those skilled in the art may readily practice the invention, that which I claim is:

1. A visual, kinesthetic, tactile and sometimes audible method for teaching students to mathematically manipulate the numbers 6 through 9 comprising the steps of:
   (a) conforming the fingers of a first one of either hand to form a symbol representative of a selected number from 6 through 9 using the following rules for construction of said symbols:
      beginning with all the fingers of either hand folded to form a first,
      (1) construct the symbol for 6 by raising one finger,
      (2) construct the symbol for 7 by raising two fingers,
      (3) construct the symbol for 8 by raising three fingers,
      (4) construct the symbol for 9 by raising four fingers;
   (b) conforming the fingers of a second one of either hand to represent a symbol for a second one of a selected number from 6 through 9 using the same rules for symbol construction set forth in step (a) above;
   (c) assigning a value of TEN to each of the upraised fingers in each hand, forming each said symbol representative of the number selected for representation on either one of said first and second hands;
   (d) assigning a value of ONE for each finger remaining folded in each hand, forming each said symbol representative of the number selected for representation on either one of said first and second hands;
   (e) determining the product for the two selected numbers now represented by the hand conforming symbols produced by steps (a) and (b) by
      (1) counting by TENS (ten, twenty, thirty ...) on each of the upraised fingers of BOTH hands;
      (2) noting the accumulated TENS value determined in step (e) (1);
      (3) determining the sum of ONES value on the symbol formed by the first one of said either hand by counting by ONE (one, two, three ...) on each of the folded fingers of said first hand;
      (4) determining the sum of ONES value on the symbol formed by the second one of said either hand in the same manner in step (e) (3);
      (5) multiplying the ONES value determined in step (e) (3) by the ONES value determined in step (e) (4); and
      (6) adding the result of step (e) (5) to the accumulated TENS value noted in step (e) (2) to obtain the product of the two selected numbers represented by the hand conforming symbols produced by steps (a) and (b).

2. The teaching method of claim 1 wherein the teaching is reinforced by audibly performing step (e).

3. The teaching method of claim 1 further comprising the following steps for teaching division of a given dividend by a given divisor wherein the divisor is in the range 6 through 9 inclusive and the dividend is greater than the divisor:
   (f) conforming the fingers of a first one of either hand to form a symbol representative of a number equal to the given divisor as per step (a) of claim 1;
   (g) conforming the fingers of a second one of either hand to form a symbol representative of a number equal to a first selected trial quotient as per step (b) of claim 1;
   (h) determining the product of the divisor and the first selected trial quotient as now represented by the hand conforming symbols produced by steps (f) and (g) in the manner set forth in step (e) of claim 1;
   (i) continuing the selection of trial quotients by conforming said second one of said either hand as in step (g) until the product determined in step (h) equals or exceeds the value of the given dividend;
   (j) noting as the answer to the division the quotient equal in value to the symbol representative of the selected trial quotient of step (i) when the product determined in step (h) equals the value of the given dividend;
   (k) repeating step (h) when the product determined in step (i) exceeds the value of the given dividend while selecting a lesser value trial quotient to represent by conforming hand symbols as in step (g) until the product determined per step (h) is equal or lesser than the value of the given dividend; and
   (l) noting as the answer to the division the quotient equal in value to the given dividend as per step (g) or, alternatively, the quotient and and any remainder when the product determined per step (k) is lesser than the value of the given dividend.

* * * * *